United States Patent [19]

Erickson et al.

[11] 4,332,766
[45] Jun. 1, 1982

[54] ONE-PIECE SHOTSHELL

[75] Inventors: Jack A. Erickson; Luke J. Davich, both of Anoka; Richard W. Proulx, Forest Lake, all of Minn.

[73] Assignee: Federal Cartridge Corporation, Minneapolis, Minn.

[21] Appl. No.: 117,580

[22] Filed: Feb. 1, 1980

[51] Int. Cl.$^3$ .............................................. F42B 7/06
[52] U.S. Cl. .................................. 264/249; 264/295; 264/296; 264/320; 264/322
[58] Field of Search ............... 264/249, 295, 296, 294, 264/320, 322; 425/392, 393

[56] References Cited

U.S. PATENT DOCUMENTS

| 202,363 | 4/1878 | Moore . |
| D. 204,608 | 5/1966 | Sobolewski . |
| 956,201 | 4/1910 | Sherman . |
| 980,351 | 1/1911 | Sherman . |
| 2,668,345 | 2/1954 | Eckstein . |
| 2,876,496 | 3/1959 | Murphy . |
| 2,987,798 | 6/1961 | Fromont . |
| 3,103,170 | 9/1963 | Covington . |
| 3,105,439 | 10/1963 | Young . |
| 3,171,350 | 3/1965 | Metcalf . |
| 3,185,095 | 5/1965 | Mayer . |
| 3,284,560 | 11/1966 | King . |
| 3,424,089 | 1/1969 | Humphenson . |
| 3,478,390 | 11/1969 | Merritt . |
| 3,492,387 | 1/1970 | Larson . |
| 3,514,468 | 5/1970 | Sutcliffe . |
| 3,557,269 | 1/1971 | Vawter . |
| 3,565,008 | 2/1971 | Gulley . |
| 3,756,156 | 9/1973 | Schuster . |
| 3,786,755 | 1/1974 | Eckstein . |
| 3,855,381 | 12/1974 | Eckstein . |
| 4,007,686 | 2/1977 | Hugonet . |
| 4,065,541 | 12/1977 | Eckstein . |

FOREIGN PATENT DOCUMENTS

| 417658 | 10/1971 | Australia . |
| 458004 | 1/1975 | Australia . |
| 1914511 | 2/1965 | Austria . |
| 1914512 | 2/1965 | Austria . |
| 717301 | 9/1965 | Canada . |
| 839148 | 4/1970 | Canada . |
| 1004814 | 2/1977 | Canada . |
| 1066131 | 11/1979 | Canada . |
| 1961307 | 6/1971 | Fed. Rep. of Germany . |
| 1960355 | 1/1976 | Fed. Rep. of Germany . |
| 1170851 | of 1959 | France . |
| 1182969 | 7/1959 | France . |
| 1325407 | 3/1963 | France . |
| 1428218 | 1/1966 | France . |
| 1492332 | 7/1967 | France . |
| 2168171 | 8/1973 | France . |
| 2270548 | 4/1975 | France . |
| 2287324 | 5/1976 | France . |
| 2317622 | 2/1977 | France . |
| 2350572 | 12/1977 | France . |
| 619925 | 5/1961 | Italy . |
| 659739 | 1/1964 | Italy . |
| 683318 | 2/1965 | Italy . |
| 469370 | 7/1937 | United Kingdom . |
| 926196 | 5/1963 | United Kingdom . |
| 1111287 | 4/1968 | United Kingdom . |
| 1192079 | 5/1970 | United Kingdom . |

OTHER PUBLICATIONS

Canadian Patent Office Record–Mechanical, Apr. 1, 1969 (Abstract of Canadian Patent 809,421, 4/1/69).

Primary Examiner—Thomas P. Pavelko
Attorney, Agent, or Firm—Schroeder, Siegfried, Vidas, Steffey & Arrett

[57] ABSTRACT

A single piece plastic shotshell comprising a tube of high density polyethylene which is uniformly biaxially oriented to a substantial degree throughout its length and has side walls of constant internal diameter, thickness, molecular orientation and physical strength, the tube having a substantially thickened integral transverse base section formed of a compressed length of the tube at one of its end portions with a longitudinally extending primer opening therein, the base section being substantially biaxially oriented and telescoped within said end portion of the tube. Apparatus and methods for making the shotshell are also disclosed.

28 Claims, 37 Drawing Figures

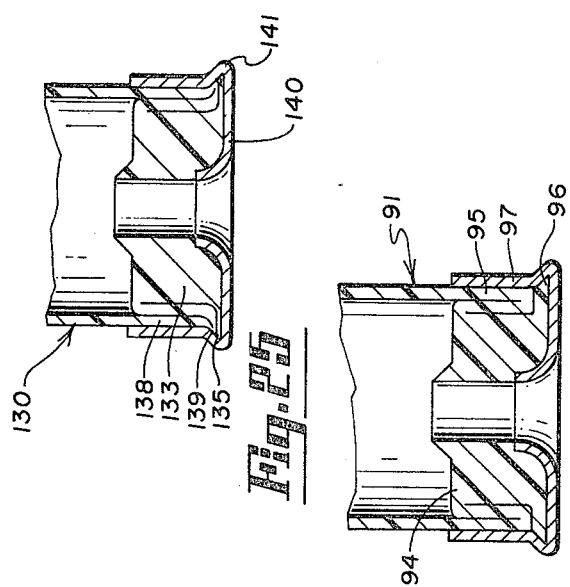
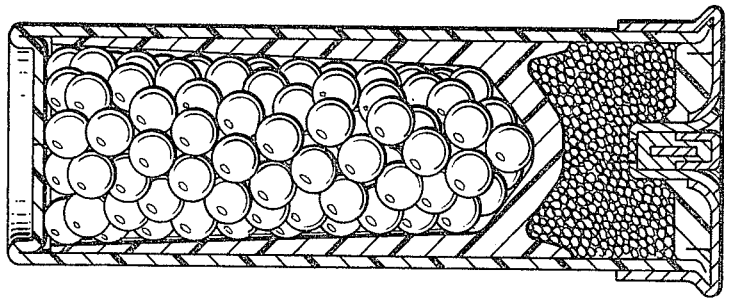
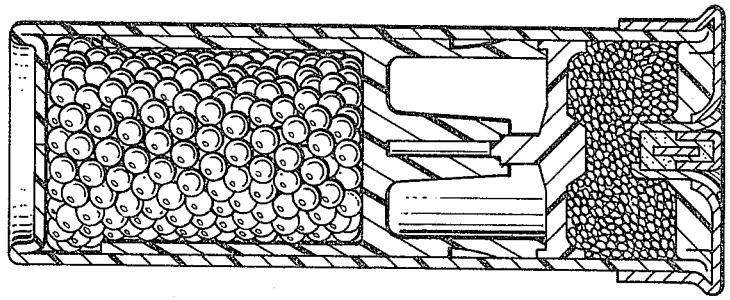
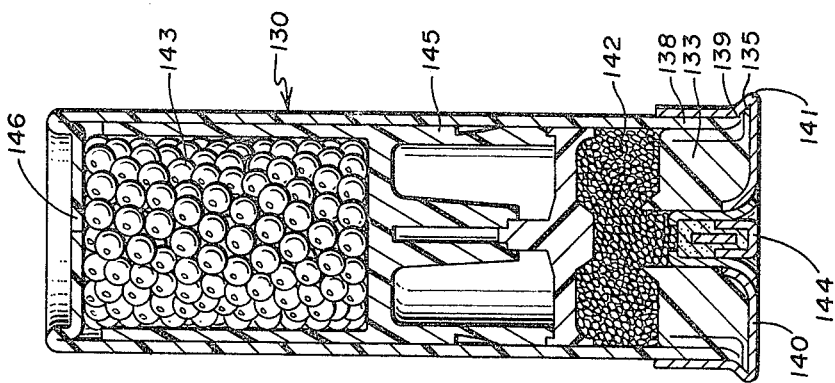

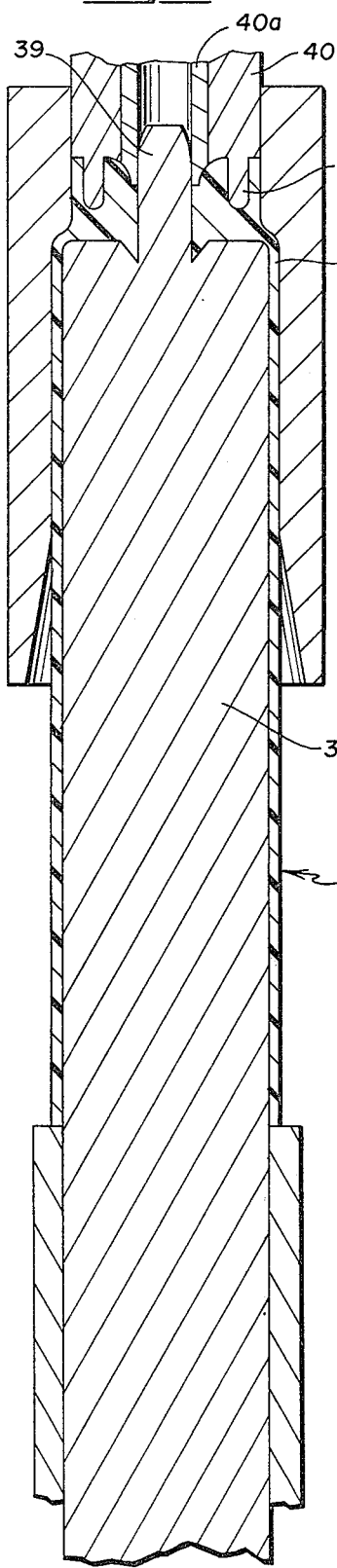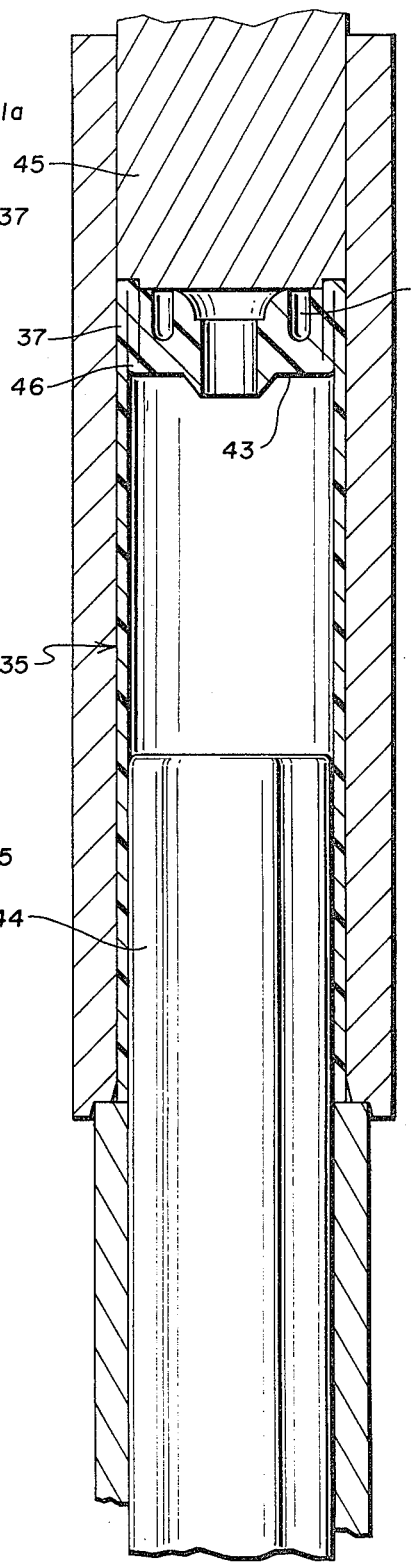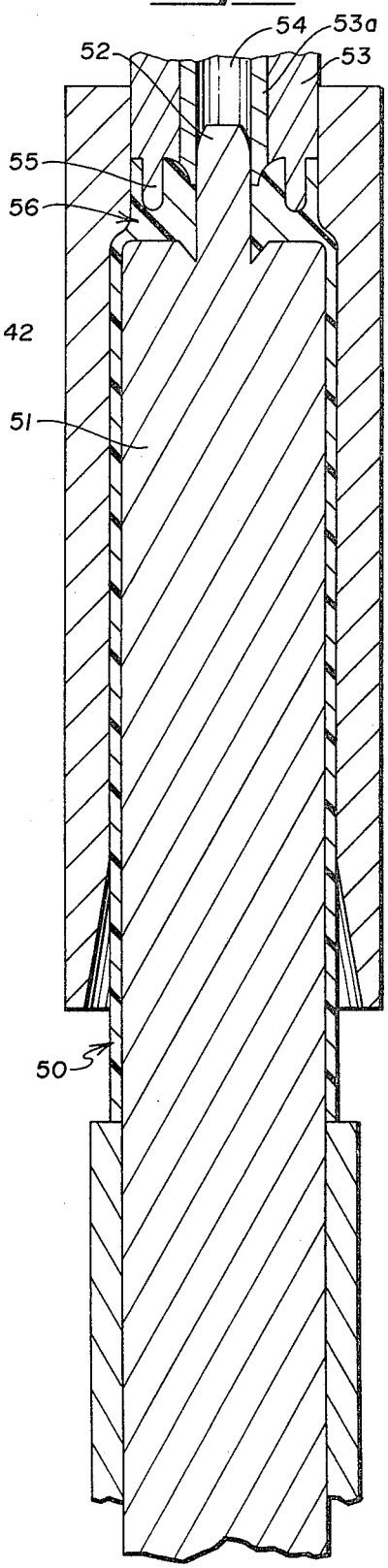

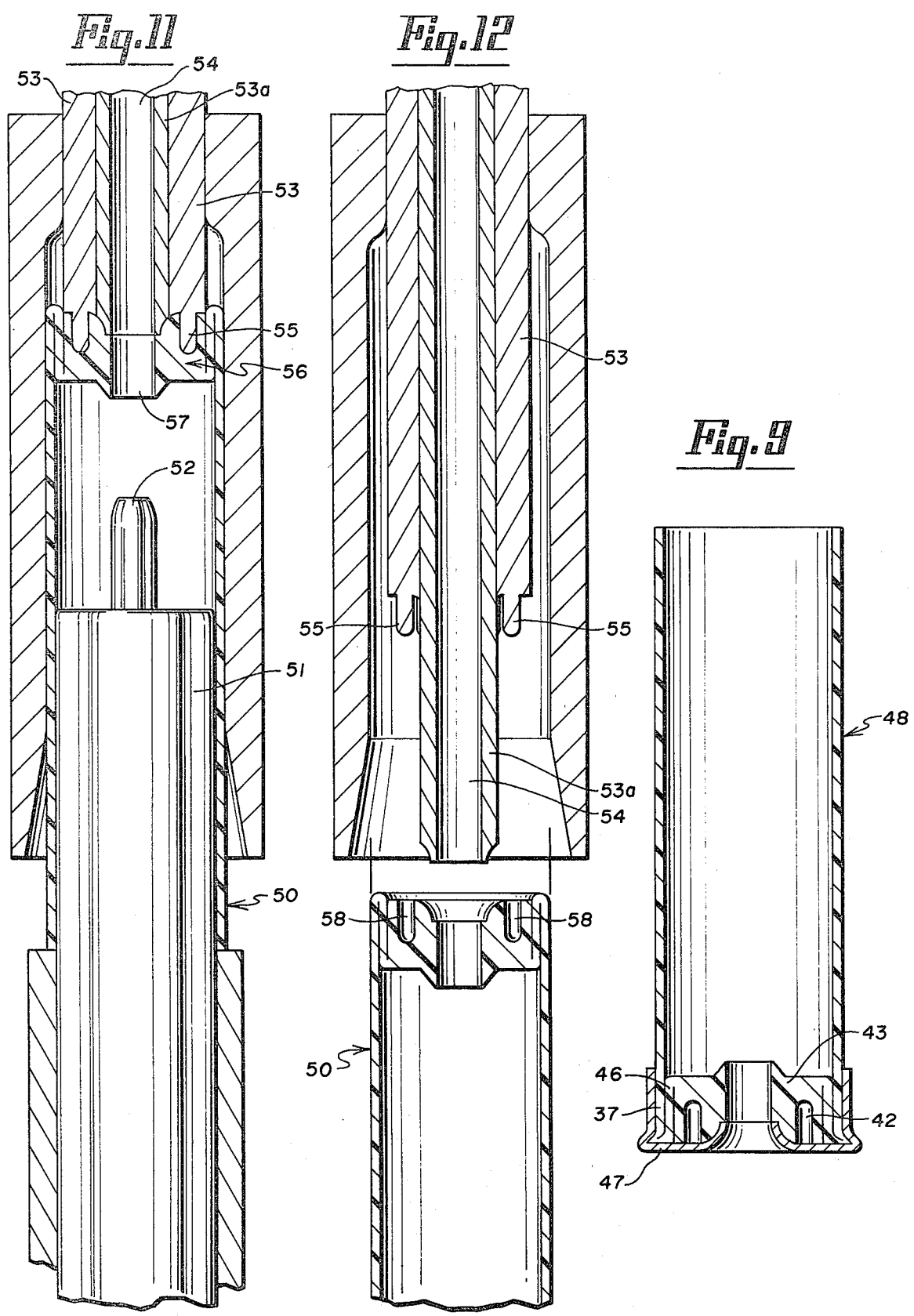

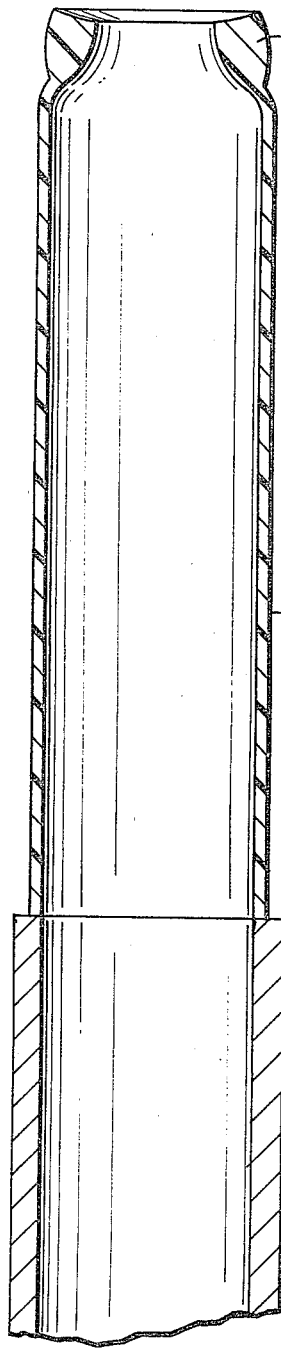
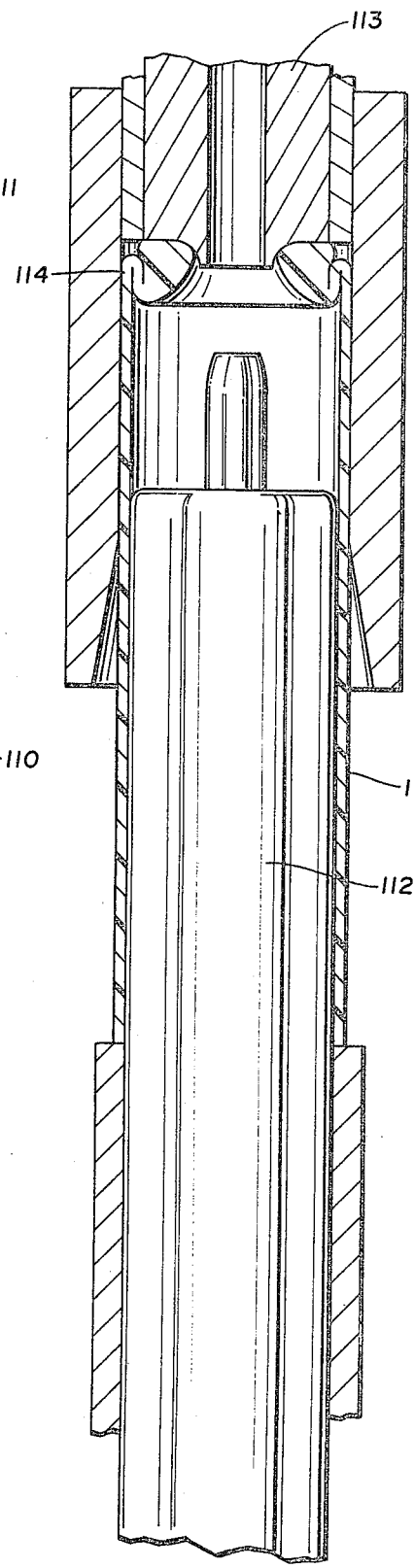
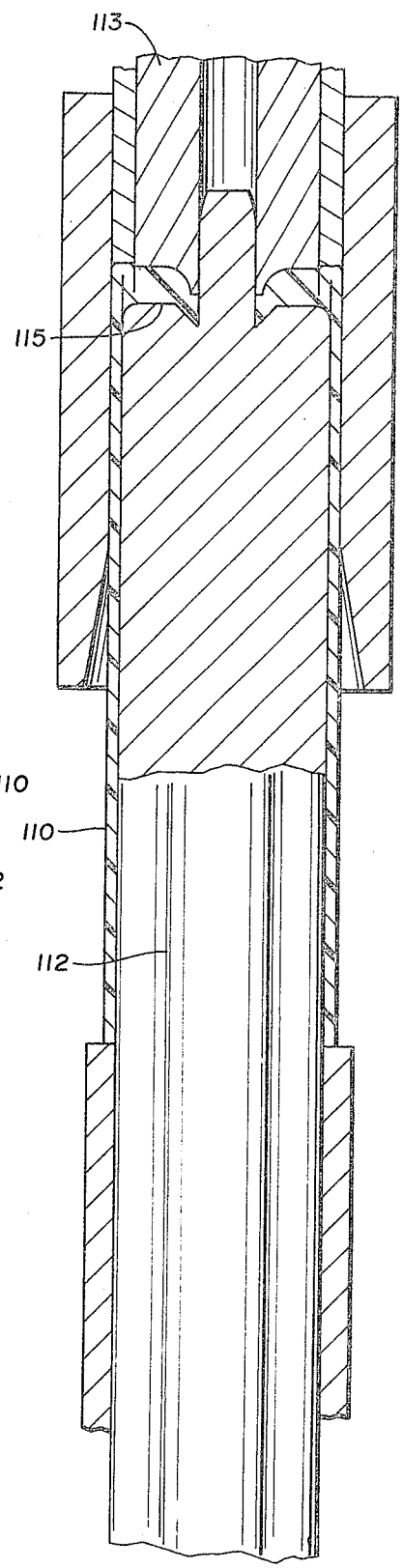

ONE-PIECE SHOTSHELL

DESCRIPTION

Background of the Prior Art

This invention relates to shotshells. More particularly, it relates to methods and apparatus for producing a one-piece low-cost highly reloadable shotshell casing.

There have been many attempts to make a satisfactory shotshell from plastic. Early attempts involved the use of injection molded plastic shell bodies and indeed, developments in molding shells continue. Most of these shells are not strong enough to resist the pressure of firing through all temperature ranges, or are suitable only when loaded to low chamber pressures; others require complicated and expensive reinforcements. They all suffer from insufficient strength to permit repeated reloading. The need for suitable strength led to the development of a number of other plastic shell disclosures as outlined hereinbelow.

As early as in 1959, Core Reissverschluss disclosed in its French Pat. No. 1,170,851, a proposal for the manufacture of an all-plastic shotshell by extruding the side walls of the casing through an annular orifice as a result of compressing a preformed plastic plug.

In 1960, Diedrich disclosed in his U.S. Pat. No. 2,961,711 a method and apparatus for continuously making a biaxially oriented plastic tube which has since been commonly used to produce shotshell casings from oriented plastic and has been known as Reifenhauser tubing.

In 1963, Covington et al disclosed in U.S. Pat. No. 3,103,170, a method of making a plastic tube in such a manner as to orient the side walls thereof both axially and circumferentially to thereby greatly strengthen same.

In 1965, Metcalf et al, in U.S. Pat. No. 3,171,350 disclosed a method for making a plastic shotshell which compressed a preform slug of plastic to produce a tube having tapered side walls which are biaxially oriented in a non-uniform manner and having a relatively non-oriented but integral base.

In 1966, King et al, in U.S. Pat. No. 3,284,560 disclosed a method of making a plastic shotshell by drawing a preformed plastic slug to produce a tube having tapered biaxially oriented side walls and a relatively non-oriented base.

In 1969, Australian Pat. No. 1,192,079 and in 1970, U.S. Pat. No. 3,514,468 disclosed another method of making a plastic shotshell in which a tubular plastic blank is longitudinally compressed and extruded in the form of a tube having longitudinally oriented side walls which are later heated at one end to form that end into an integral base. A second form of the invention disclosed shows how a tube of the same shape could be molded from molten plastic.

In 1970, Larson, in U.S. Pat. No. 3,492,387 disclosed a method of drawing a preformed slug to make a plastic shotshell having a biaxially oriented side walls of uniform internal diameter and an integral essentially non-oriented plastic base.

In 1973, Lansell, in Australian Pat. No. 3,154,571 disclosed a method of making a shotshell having side walls of uniform thickness which are formed from a preform and are oriented longitudinally.

In 1974, Eckstein et al, in U.S. Pat. Nos. 3,786,755 and 3,855,381 disclosed a method of making a plastic shotshell from a preform by extending the tubular side walls and leaving a thickened end which is formed into an integral basewad which is essentially non-oriented.

In 1977, French Pat. No. 3,450,572 disclosed a two-piece all plastic cartridge case in which a plastic basewad is ultrasonically welded within the separate plastic tube.

In December 1977, Eckstein et al, in U.S. Pat. No. 4,065,541 disclosed a method of making a special primer seal for an all-plastic shotgun shell which is made from a preformed slug by extrusion, the tubular walls being longitudinally oriented and the base being essentially non-oriented. The latter is formed from a thick end portion which extends above the tube-forming die wall.

In February 1979, Ballrich et al, in U.S. Pat. No. 4,140,058 disclosed a method of making a two-piece shotshell casing in which the separate basewad is joined to the biaxially oriented tube walls by ultrasonic energy.

From the above, it is clear that the industry has recognized the desirability of a satisfactory one-piece plastic shell casing having an integral basewad for about a quarter century. While these attempts at a strengthened shell are an improvement over earlier efforts in molding or the use of unstrengthened plastic, they have exhibited shortcomings in either cost, adaptability to loading or reload life.

Some of the shotshells referenced above have tapered side walls, resulting in an internal diameter that increases from the area near the powder charge to the mouth of the shell. Where this condition exists, the obturating wad, which on firing seals the expanding powder gases, may not expand sufficiently as it passes from a small diameter zone into a large diameter zone, allowing gases to escape between the wad and tube, with a resultant loss of ballistic properties.

Some of these shotshells are made by the reforming of molded preforms into one-piece casings; others involve the attachment of separate basewads to pieces of extruded tubing. Both of these methods are relatively costly. Most of the one-piece designs identified above require a greater amount of plastic than this invention. Those with separate basewads are subject to loosening of the basewad, particularly if the basewad were to have a very low height. Those shotshell casings which require the application of heat to the area of the tube near the basewad during manufacture are susceptible to a reduction of tube strength and, therefore, reload life.

A definite need exists in the industry for a one-piece plastic shell having all of the attributes of being capable of being manufactured relatively inexpensively, having relatively thin casing side walls of uniform internal diameter, the plastic being biaxially oriented uniformly throughout its length, coupled with an integral basewad. The basewad should be capable of being sufficiently thin to permit substantially increased propellant and shot volumes as may be needed for magnum loads or steel shot loads, and yet strong enough to withstand the increased pressures thereby generated. In addition, it is important that such a shell be capable of being fired and reloaded many times, because a significant portion of shotshells sold are to those who reload their own shells. The shell casing of this invention, as disclosed herein, meets each of these requirements and is specifically designed to provide the strength needed to increase substantially its reloadability, particularly in the area of the tube adjacent the base and mouth of the cup constituting its surrounding head.

BRIEF SUMMARY OF THE INVENTION

We have designed a shell to provide the desirable attributes outlined above. We have accomplished this by first selecting a piece of uniformly biaxially oriented plastic tubing having side walls of uniform diameter and thickness throughout and having a predetermined length substantially greater than the length of desired shell. Plastic tubing of the Diedrich type identified above is satisfactory for this purpose. We heat one end portion of that piece of tubing only sufficiently to soften the same and not sufficiently to destroy completely its biaxial orientation. It will be noted that the external diameter of the tube returns to approximately the same size of the tube prior to orientation. Care is taken to see that a substantial degree of biaxial orientation is retained in the softened end portion, which is then compressed in a die into the shape of a shotgun shell base.

Thereafter, when the cool process is being used, the softened end portion or base is permitted to cool sufficiently to firm up, and the formed base is then telescoped into the adjacent side wall portions of the tube, resulting in a one-piece plastic shotgun shell casing having an integral base. Thereafter, the head is applied to the telescoped end portion and secured thereto in the conventional manner, as is well known in the trade and disclosed in one or more of the above patents.

When the hot process is used, the softened base is formed and telescoped into the adjacent side wall portions in a single step. Thereafter, the head is applied to the telescoped end portion and secured thereto in the same manner as that utilized in conjunction with the cool process.

We have found that the shotshell casing can be manufactured in accordance with the above at relatively low cost because it can be made from less material and from readily available, relatively inexpensive biaxially oriented plastic tubing which has uniform, but thin side walls. The forming machinery required is relatively simple and inexpensive and lends itself to automation, permitting a high production rate to be achieved, with relatively little scrap material. Moreover, such a casing retains a desirable relatively high degree of strength in both its base and sidewall sections, thereby minimizing tube failure occurrences. Since the basewad is integral, problems caused by loosened basewads are avoided. Also, the height of the base section may be made very low, thus greatly increasing the versatility of the casings as to the volume.

We have also found that shotgun shell casings utilizing the telescoping feature may be fired and reloaded approximately twice as many times as our shell casings manufactured without this feature. We believe that these reloadability improvements are the direct result of superior orientation and strength of materials in the tube area adjacent the head.

It is a general object of our invention to provide a relatively inexpensive functional shotshell casing.

A more specific object of our invention is to provide a low-cost highly reloadable shotshell casing with an integral basewad.

A still more specific object of our invention is to provide a method of making a highly reloadable plastic shotshell casing with an integral basewad from a commonly known extruded biaxially oriented plastic tube.

Another object is to provide a highly reloadable shotshell casing with an integral basewad which provides increased volume for the shot and propellant charges.

Another object is to provide a highly reloadable shotshell casing having an integral basewad and side walls of uniform interior diameter.

Another object is to provide a highly reloadable plastic shotshell casing having an integral basewad, increased volume, and side walls of uniform interior diameter.

Another object is to provide a highly reloadable plastic shotshell casing having an integral base and side walls of uniform relatively thin dimensions throughout their length.

Another object is to provide a highly reloadable plastic shotshell casing which has an integral base, increased capacity, and requires less plastic material for its manufacture.

Another object is to provide a low-cost single-piece highly reloadable plastic shotshell casing, the basewad and side walls of which are each biaxially oriented to a substantial degree.

Another object is to provide a highly reloadable plastic shotshell casing having an integral basewad and a head and having side walls in the area of its head which are of non-reduced strength.

Another object is to provide a method of making a low-cost highly reloadable plastic shotshell casing having an integral basewad which may be readily incorporated into a previously known continuous production line of shotshell manufacture.

These and other objects and advantages of our invention will more fully appear from the following description, made in connection with the accompanying drawings, wherein like reference characters refer to the same or similar parts throughout the several views, in which:

BRIEF DESCRIPTION OF THE DRAWINGS

FIG. 1 is a vertical sectional view of a loaded shotshell of standard length manufactured in accordance with the preferred form of our invention and having a basewad of approximately standard axial dimensions;

FIG. 2 is a vertical sectional view of a loaded shotshell of standard length manufactured in accordance with our invention and having a basewad of substantially lesser axial dimension, thereby providing greater volume for both shot and propellant, as shown;

FIG. 3 is a vertical sectional view of a loaded shotshell manufactured in accordance with our invention, having a basewad of restricted vertical dimensions and illustrating its versatility, whereby greater volume of shot and propellant may be utilized within a shell of standard length;

FIG. 7 is a vertical sectional view of the tube with its softened end as shown in FIGS. 4-6, with a second forming die member moved into base-forming position in accordance with our invention.

FIG. 8 is a vertical sectional view of a second set of die members by means of which the tube formed in FIG. 7 has its base telescoped axially inwardly within the portions of the tube adjacent to its base, in accordance with our invention;

FIG. 9 is a vertical sectional view of the shotshell casing shown in FIG. 8 after it has been headed in the conventional manner;

FIG. 10 is a vertical sectional view of a piece of softened tubing with a base thereon having recesses formed therein and formed in accordance with our invention with a single set of dies, while the tube end remains soft;

FIG. 11 is a vertical sectional view of the tubing with the base formed in FIG. 10, with the lower section of the die having been withdrawn, after a pause for cooling of the softened plastic, and with the upper section telescoping the base within the tube;

FIG. 12 is a vertical sectional view of the upper die member shown in FIG. 11 with the punch section thereof having been completely withdrawn and the inner portion of the upper section having descended to discharge the finished casing;

FIG. 15 is a fragmentary vertical sectional view of the shell casing of FIG. 14 after having been headed in the conventional manner;

FIG. 25 is a fragmentary vertical sectional view of the shell casing of FIG. 24 after it has been headed in the conventional manner;

FIG. 29 is a vertical sectional view of a predetermined length of plastic tubing having been softened by heat in preparation for being formed by a single set of die members into a shell casing having a telescoped base of small axial dimensions;

FIG. 30 is a vertical sectional view of the heated end of the tube of FIG. 29, while still warm, being telescoped within the adjoining portions of the tube by the upper one of the die members;

FIG. 31 is a vertical sectional view of the die members of FIG. 30 forming the end portion, shown therein, in the same operation, into a tube having a telescoped base section of small axial dimensions;

FIG. 37 is a fragmentary vertical sectional view of the shotshell casing shown in FIG. 36 after a head has been secured thereto.

Figure 4:
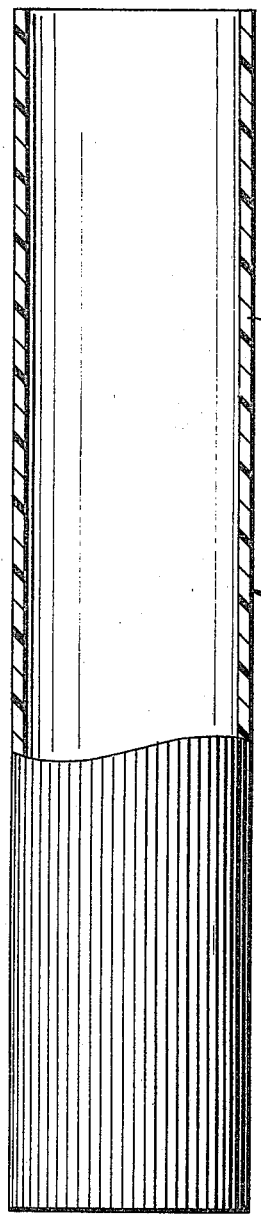
FIG. 4 is a side elevational view, with portions broken away, of a section of plastic tubing pre-cut to a predetermined desirable length for use in practicing our invention.

A wide variety of tubular thermoplastic polymeric materials have been used in the past for shotshell casings and may be used with varying degrees of success in preparing shotshell casings according to this invention by molding, extruding or by other forming procedures.

However, it is preferred that the polymeric materials utilized be of the crystalline type which upon being worked, as by being extruded or stretched, undergo crystalline orientation. Orientation of the crystalline structure along the major axis of a shotshell tube of such polymeric materials produces a preferential increase in tensile strength along the axis of the tube. The stretching of the plastic in a lengthwise direction along the longitudinal axis has a tendency to linearize the random polymer chains along that axis i.e., they are then referred to as being oriented. The chains thus linearized and locked into a preferential crystalline structure or lattice are strengthened due to the chemical bonds being aligned parallel to the longitudinal axis. The weaker bonds between the polymer chains are aligned perpendicular or near so to the longitudinal axis.

Olefinic polymers such as high density polyethylene and polypropylene having a high degree of crystallinity i.e., at least about 60% to 70%, are particularly preferred polymeric materials for use in this invention. The degree of crystallinity of these materials may be determined by various methods but usually X-ray diffraction, infrared absorption or differential scanning calorimetric analysis are used.

The most preferred polymeric materials are polyethylene copolymers or ethylene copolymerized with another olefinic such as butene-1 or hexane-1. Generally, however, the materials and characteristics thereof as described in U.S. Pat. No. 3,103,170 to Covington, Jr. et al are satisfactory for this invention. The content of that patent is incorporated herein by reference.

All of the above described preferred polymeric materials are generally termed herein "crystalline plastics". Such crystalline plastics for shotshell casings may be oriented by providing a length of one-piece cylindrical tubing of crystalline polymer at a temperature approaching but below its crystalline melting point and extruding it or stretching it so as to provide longitudinal crystalline orientation therein as is known in the art. For example, see U.S. Pat. No. 3,514,468 to Sutcliffe et al, the content of which is incorporated herein by reference. Such tubing, if desired, may be stretched in a radial direction to greatly increase its strength in that direction, as well.

DETAILED DESCRIPTION OF THE INVENTION

Utilizing one of the crystalline plastics identified above, we have found that we can produce a relatively inexpensive functional shotshell casing by using the methods described hereinbelow. We have found that perhaps the strongest casing, overall, can probably be produced by permitting the softened end portion of the tubing to cool slightly before telescoping same and, therefore, this is the preferred form of the invention. There are advantages, however, particularly from a manufacturing viewpoint in minimizing such a cooling period, in that an excellent and improved casing, as compared to those previously known, can be produced more rapidly and hence, less expensively. Consequently, it may be that from a practical or economic viewpoint, the latter form may be preferred by others.

In accordance with the above, we have shown in FIG. 4 a section of tubing of such crystalline plastic cut to a predetermined length which is greater than the standard shell lengths. The tubing is of the type well known in the trade in that it is biaxially oriented along its longitudinal and transverse axes, the orientation is uniform throughout its length, and its side walls are of uniform thickness throughout. It may be manufactured in accordance with the Covington U.S. Pat. No. 3,103,170, or it may be of the Reifenhauser type well known in the trade, the latter having been uniformly stretched substantially both axially and circumferentially during its manufacture in order to greatly increase its strength in each of these directions.

Figure 5:
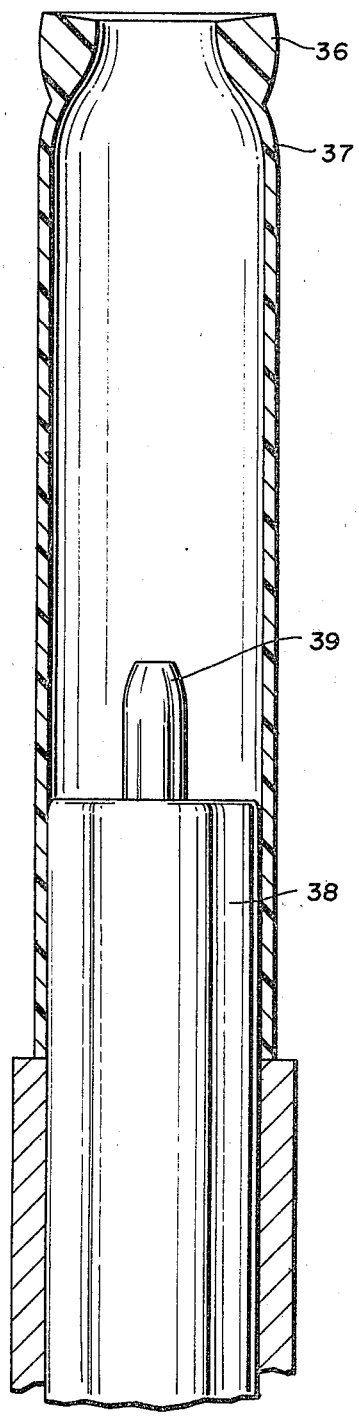
FIG. 5 is a vertical sectional view of the piece of tubing shown in FIG. 4, after the end thereof has been heated and thereby softened in accordance with our invention.

As shown in FIG. 4, the selected tube 35 is cut to the desired length and has the physical characteristics outlined above. It is then subjected at one of its ends to a source of heat while rotating the tube so as to soften the plastic at that end and cause it to shrinkback, as shown in FIG. 5 at 36. Various forms of heat may be used but we prefer to utilize a an elliptical Infrared Line Heater of the Model 5212 type produced and sold by Research, Inc., of Minneapolis, Minnesota, U.S.A. The length of the end portion to be heated depends, of course, upon the axial dimensions desired for the base section to be formed therefrom. The portions of the tube not to be softened are not exposed to the intense heat source. Other sources of heat, such as hot glycol, may be utilized.

The softened end portion 36 is heated to an optimum temperature of 370°-375° F. This normally requires such heating as described above for a period of 9–14 seconds, which is typical. After that period, the tube 35 may be applied to a die member or punch 38 having an axially located primer opening-forming pin 39 at its upper end, as shown in FIG. 5. Of course, if desired, the tube 35 may be applied to the die member 38, as shown in FIG. 5, prior to the application of heat described above. After forming the casing as shown in FIGS. 4–9, inclusive, we then permit the end portion 36 to cool in the unheated forming tooling approximately 4–16 seconds for base sections having axial dimensions up to 0.280".

Figure 6:
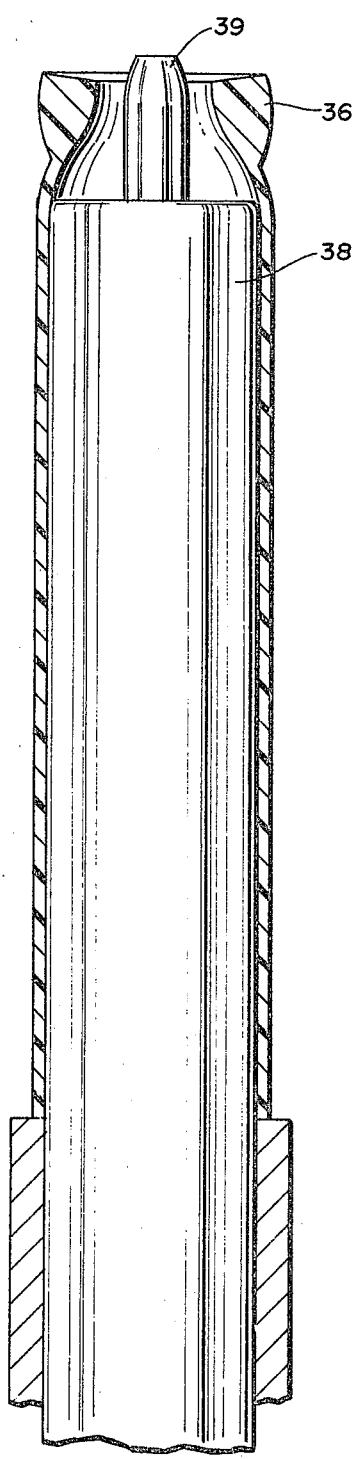
FIG. 6 is a vertical sectional view of the tube with its softened end, as shown in FIG. 5, with a punch moved into position in accordance with one form of the invention, in preparation of the forming operation.

FIG. 6 shows the punch 38 having been moved upwardly into position to engage the softened end portion 36 for the base forming process. It will be noted that, as shown, the external diameter of the tube returns to approximately the same size of the tube prior to orientation.

FIG. 7 shows the base forming operation which takes place for 4–16 seconds after the end portion 36 has been properly heated, as described. The upper member or section 40 of the die has an axial opening 41 which receives pin 39 and has a plurality of depending circumferentially spaced pins 41a which form axially extending openings 42 in order to reduce the amount of plastic used. As shown, the two die members 38 and 40 form the softened end portion 36 into a base section 43, commonly referred to as a "basewad", which is integral with the supporting side walls 37 of the tube. In so doing, die pressure approximating 185-200 p.s.i. are utilized. The die clearances utilized are 0.0004" to 0.005". The thickness of the wall tubing may approximate 0.012"–0.039".

After the integral base section 43 has been formed, as shown in FIG. 7, and permitted to cool 4–16 seconds for basewad thicknesses up to 0.280", the die member 38 is withdrawn and die member 40a is lowered to push out the formed case. This operation is not shown since it is well known in the art. Thereafter, the newly formed casing is applied to a second set of die members, as shown in FIG. 8, the lower one 44 being moved upwardly within the tube to support the same at its end opposite the base section 43 as shown, and the upper one 45 descending to engage the base section 43 and telescope the same into the adjacent and supporting wall structure 37 of the tube as clearly shown in FIG. 8.

It will be noted that the telescoping action demonstrated in FIG. 8 causes the supporting wall structure 37 to be reversed upon itself and to form an annular wall 46 which extends concentrically in contiguous relation against the exterior of the base 43 and the interior of the walls of tube 35.

After the telescoping operation, shown in FIG. 8, has been completed, the die member 44 is withdrawn and die member 45 is lowered to cause the formed one-piece casing to drop free of the die. Thereafter, a head member 47 may be applied in the conventional manner and secured thereto to produce a finished shotshell casing 48, as shown in FIG. 9. The casing shown therein has a base section 43 of standard axial dimensions.

FIGS. 10–15, inclusive, show a second and more simple method of manufacture of a single piece shotshell casing having an integral base section from such a piece of tubing 35 which, for the sake of clarity, has been identified with the numeral 50.

FIG. 10 shows such a piece of tubing 50 formed after its end has been softened as hereinbefore described and as shown in FIGS. 4–6, inclusive. In this form of the invention, a single set of die members is utilized, the lower one 51 of which has a primer-opening forming pin 52 similar to that shown in FIGS. 5–7. The upper die member 53 has an axial opening 54 which receives the pin 52. It also has a plurality of depending circumferentially spaced pins 55. The pin 52 forms the primer opening 57 in the integral base section 56 and the pins 55 form the openings 58 in the base section to minimize the amount of plastic utilized.

After the integral base section 56 has been formed, as shown in FIG. 10, a slight cooling pause of about 4 to 16 seconds is employed in the operation. Thereafter, the lower die member is withdrawn, as shown in FIG. 11 and, as shown in FIG. 12, upper die member 53 is lowered to cause the base section 56 to telescope within the supporting walls 59 of tube 50. In the next step of the operation, shown in FIG. 12, the lower die member 51 is withdrawn completely and upper die member 53a is dropped sufficiently to cause the casing to be ejected. Thereafter, it may be headed as described above to produce a headed casing, as shown in FIG. 9.

It will be noted that die member 53 has a smaller external diameter than the internal diameter of the tube 50 and thus the telescoping operaton is thereby facilitated, as shown in FIG. 11. It will also be noted that this is essentially a one-step operation in that a single set of die members are required and that a minimum amount of cycle time is required.

Figure 13:
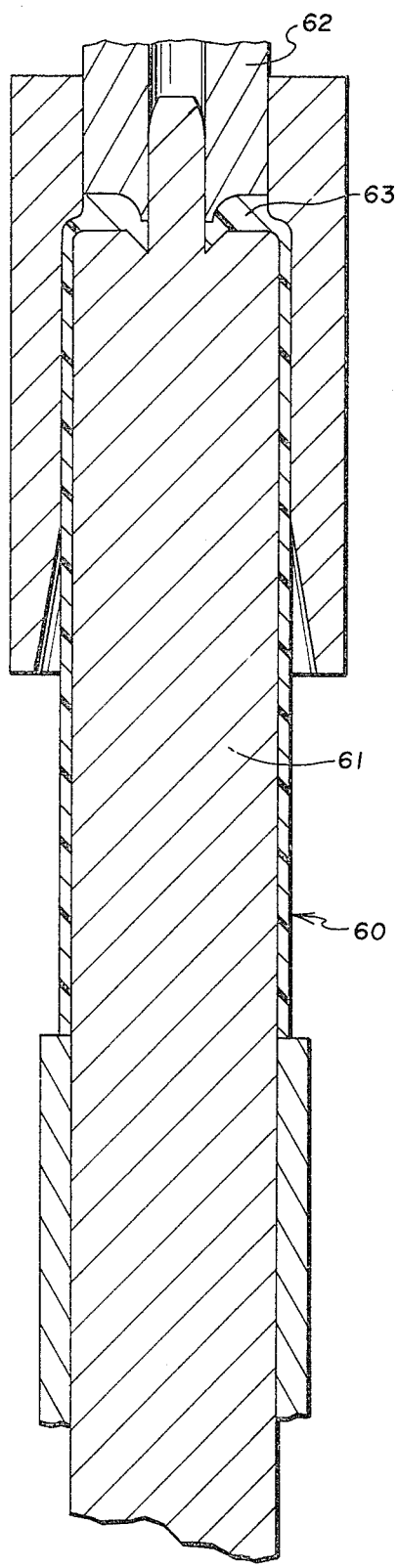
FIG. 13 is a vertical sectional view showing the first of two pairs of die members forming a shell casing from a softened end of tubing, such as shown in FIG. 6, with a base of small axial dimensions.
Figure 14:
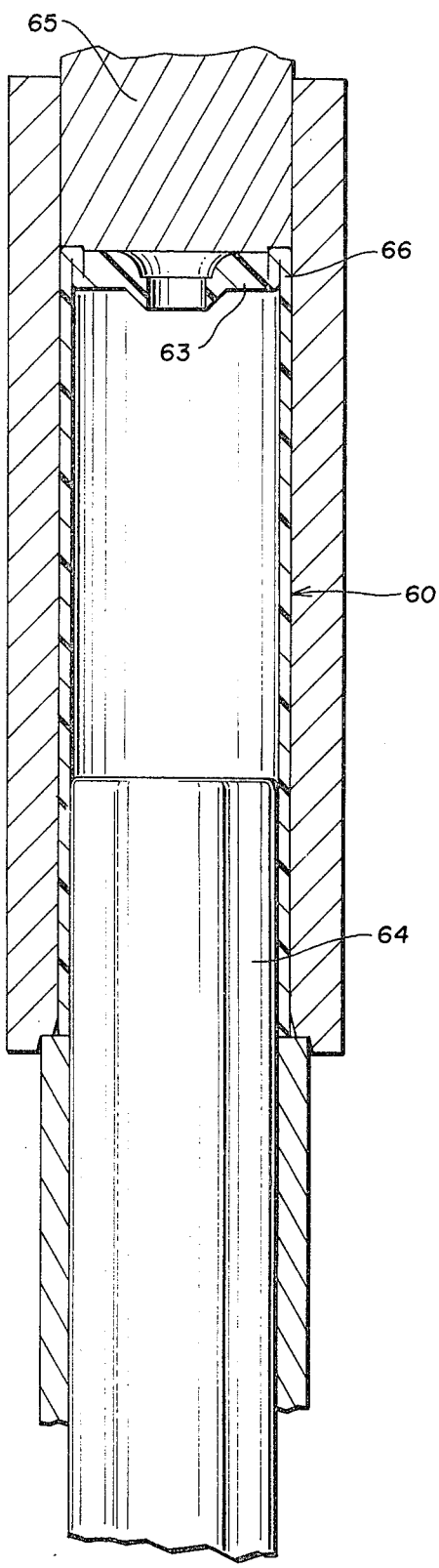
FIG. 14 is a vertical sectional view showing a second set of die members telescoping the base within the tubing in accordance with our invention.

FIGS. 13–15, inclusive, show a two-step forming operation in that, as in FIGS. 4–9, two sets of dies are utilized. FIGS. 13–15, however, show the manufacture of a one-piece shotshell casing having improved volume characteristics in that the base section is relatively thin, as compared to base sections of one-piece shotshell casings heretofore known. Thus, a piece of tubing 60, identical to the piece 50, except that it is shorter, is heated in the same manner as hereinbefore described except that a substantially shorter end portion is so softened. Therefore, when lower die member 61 and upper die member 62 are applied to the softened end portion, a substantially thinner base section 63 is formed.

We have found, however, that the base sections, when formed in the manners herein described, retain substantial amounts of biaxial orientation so that it is no longer necessary to utilize base sections having axial dimensions as great as heretofore required. Thus, as shown in FIGS. 13–15, a much thinner base section may be utilized, the axial dimensions of which may range from 0.115" to 0.350" or more, the latter approximating the depth of the standard basewad. As a consequence, when base sections such as shown in FIGS. 13–15 are utilized, the percentage of the total volume of the casing which is utilized by the base section may be as low as 4.4% in a standard 3Δ 12 gauge shell and 4.95% in a standard 2¾" 12 gauge shell. Thus, the remaining volumes for shot and propellant may be as great as 95.6% and 95.05% of the total volume, respectively. This permits the use of much greater volumes of shot and propellant and is particularly valuable when steel shot is required, as demonstrated by visual reference to FIG. 3 in which a shell utilizing such a relatively thin base section is shown.

Referring now to FIG. 13, it will be seen that die member 62 is of lesser circumferential dimensions than the interior of tube 60. After the base section 63 has been formed, as shown in FIG. 13, the die member 61 is removed, die member 62 is lowered to eject the casing, and the latter is permitted to cool a minimum of 14 seconds. The casing is then applied to die member 64 which supports the same sufficiently to permit die member 65, when lowered to the position shown in FIG. 14 to telescope the base section 63 into the adjacent and supporting wall structure 66 of the tube 60. Thereafter, die member 64 is withdrawn and die member 65 is lowered to eject the casing which may, as shown in FIG. 15, have a head 67 secured thereto. It will be noted that the base section 63 and the base sections 43 and 56 of FIGS. 8 and 11, respectively, are in each instance telescoped entirely within the confines of the supporting wall structure of its respective tube.

Figure 16:
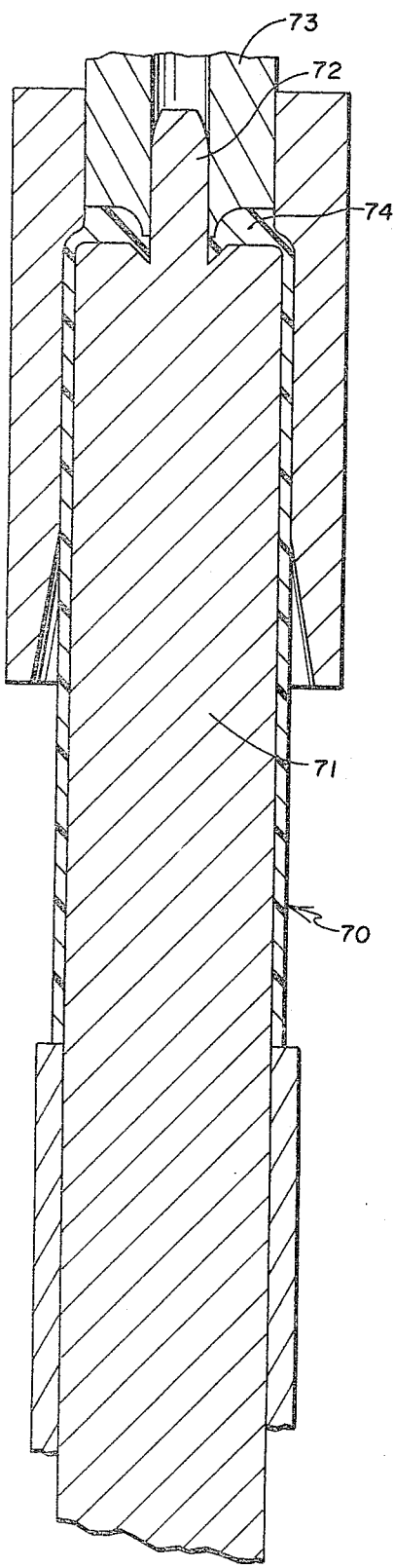
FIG. 16 is a vertical sectional view of a single set of die members forming a shell casing having a base of small axial dimensions from a piece of tubing, such as shown in FIG. 6.
Figure 17:
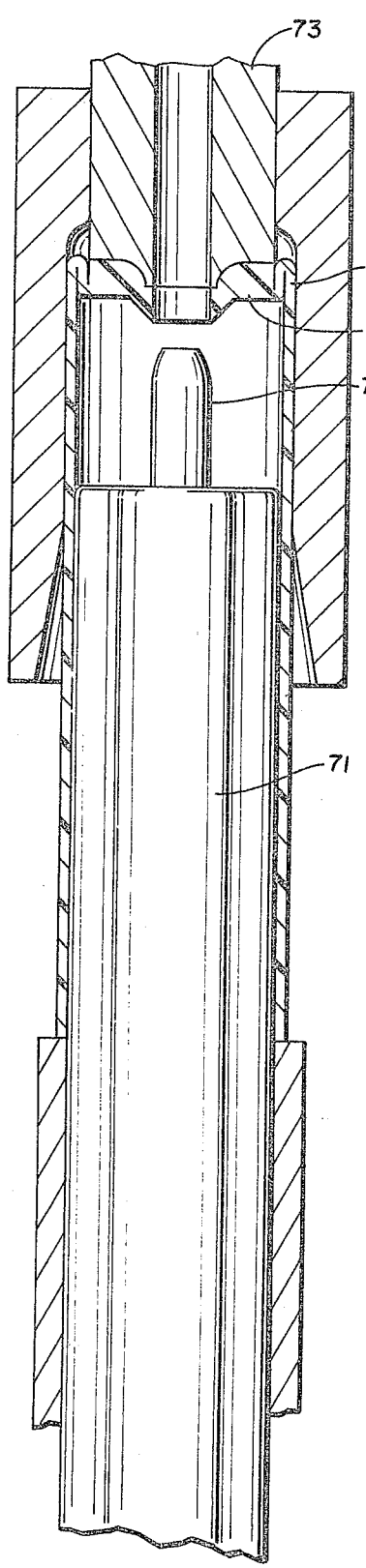
FIG. 17 is a vertical sectional view of the same set of die members shown in FIG. 16 with the punch having been retracted while the upper die member telescopes the base within the tubing.
Figure 18:
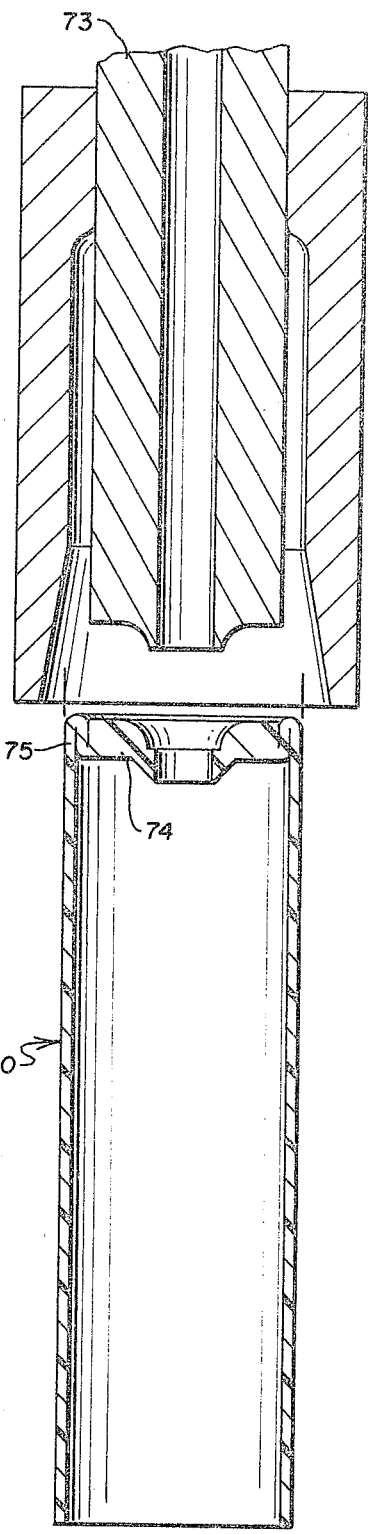
FIG. 18 is a vertical sectional view of the shell casing formed in FIG. 17 with the lower section of the die withdrawn and the upper section having been lowered to eject the finished casing.

FIGS. 16–18, inclusive, show a one-step method of producing a shotshell casing having a thin, telescoped base section. The tube 70 has had its end portion softened, as in FIGS. 4–6, except that a shorter end portion was heated. The tube 70 is applied to die member 71 having primer opening forming pin 72 thereon and upper die member 73 is then lowered to form base section 74 which is substantially thinner than the conventional basewad of a standard shell. After a brief pause, lower die member 71 is partially withdrawn, as shown in FIG. 17, and upper die member is lowered, causing the base section 74 to telescope within the supporting walls 75. Thereafter, lower die member 71 is withdrawn entirely and upper die member 73 is lowered further, causing the casing to eject, as shown in FIG. 18. The casing is thereafter headed in the same manner as hereinbefore described to provide a low cost high capacity highly reloadable shotshell casing.

Figure 19:
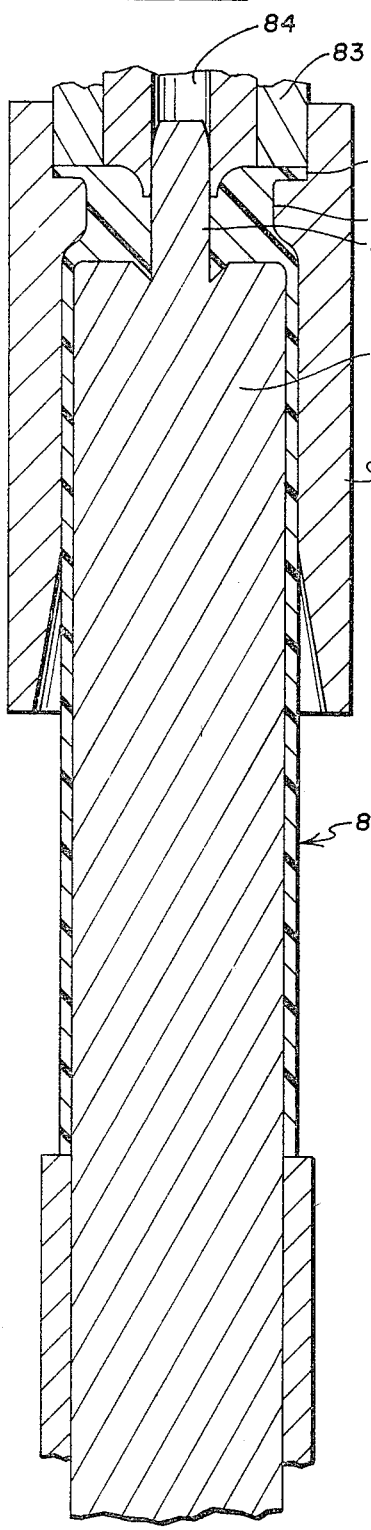
FIG. 19 is a vertical sectional view of a first set of die members forming a shell casing having an integral flanged base from a piece of tubing, such as shown in FIG. 6.
Figure 20:
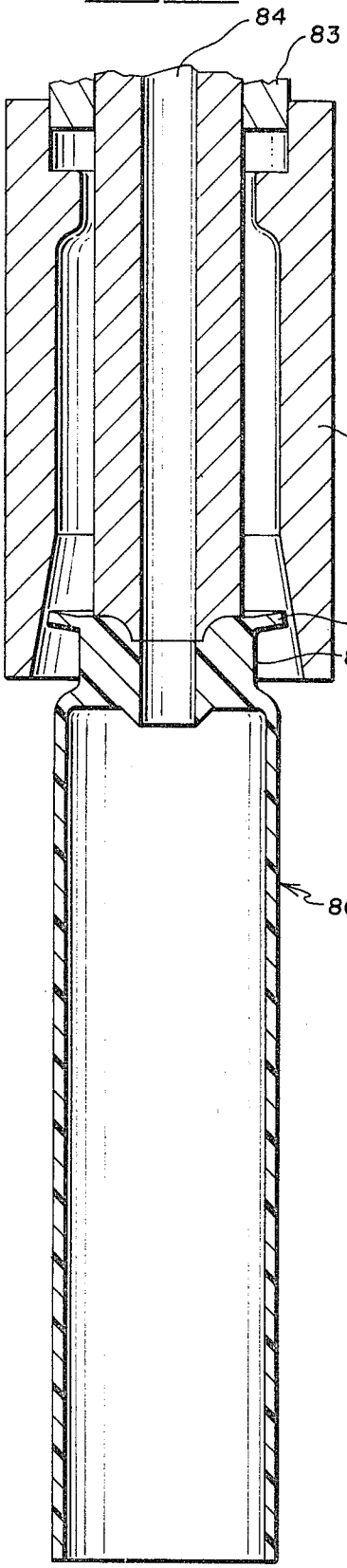
FIG. 20 is a vertical sectional view showing the upper die member of FIG. 19, after a cooling pause, lowered to eject the casing having a flanged base of standard axial dimensions.
Figure 21:
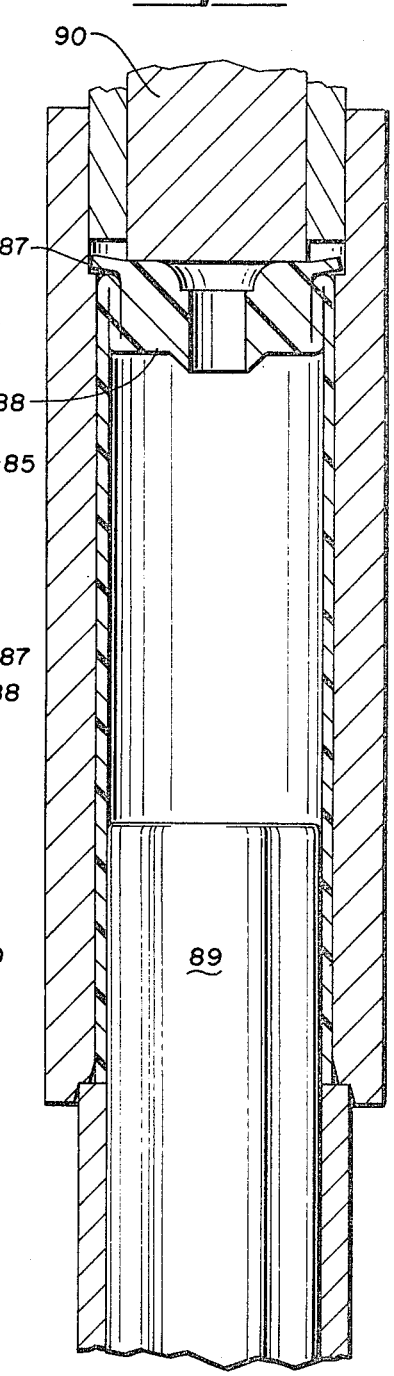
FIG. 21 is a vertical sectional view of a second set of die members telescoping the base of the casing shown in FIG. 20 within the supporting walls of the tube.

FIGS. 19–21, inclusive, show a two-step method for producing a one-piece shotshell with a flange or rim at its inner end. As shown, a piece of Reifenhauser tubing 80 is heated at one end about 9–14 seconds and inserted in a first die, the lower member 81 of which has an axial primer opening forming pin 82 which extends upwardly into the axial opening 84 of the upper die member 83. Die member 85 has a shoulder 86 which, together with upper die member 83, defines a groove which forms a rim 87 at the inner end of the casing base section 88. It remains in the die 4–18 seconds and is then removed, as shown in FIG. 20, by withdrawing lower die member 81 and lowering upper die member 83, causing the casing to eject. After cooling same, a minimum of 14 seconds, we place the casing in a second of die members, as shown in FIG. 21, the lower one 89 of which supports the casing and the upper 90 of which, when lowered, causing the base section 88 to telescope within the base section supporting walls of the tube. Thereafter, the die member 89 is withdrawn and die member 90 is lowered to eject the casing, after which a head may be secured thereto in the conventional manner.

Figure 22:
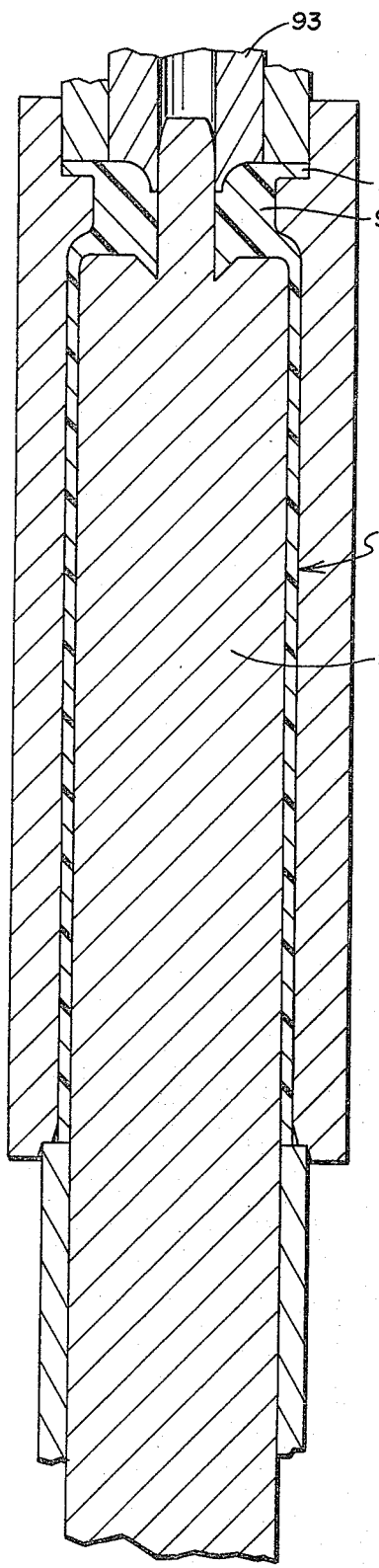
FIG. 22 is a vertical sectional view of a set of die members forming a shell casing having an integral flanged base of standard dimensions from a piece of tubing such as shown in FIG. 6.
Figure 23:
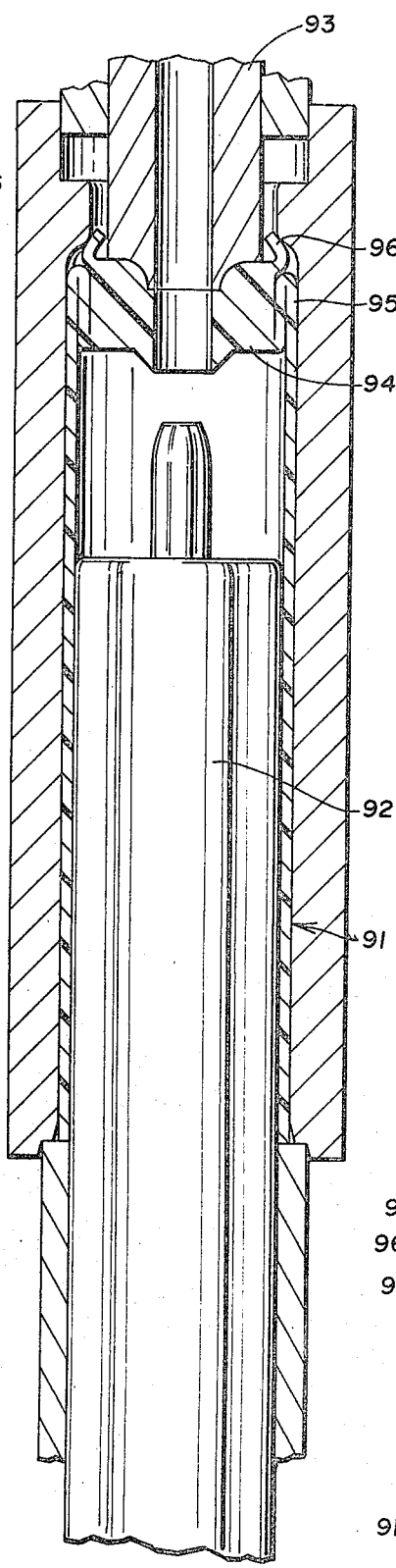
FIG. 23 is a vertical sectional view of the die members of FIG. 22 with the punch having been withdrawn and the upper die member, after a cooling pause, telescoping the base within the supporting walls of the tube, in accordance with our invention.
Figure 24:
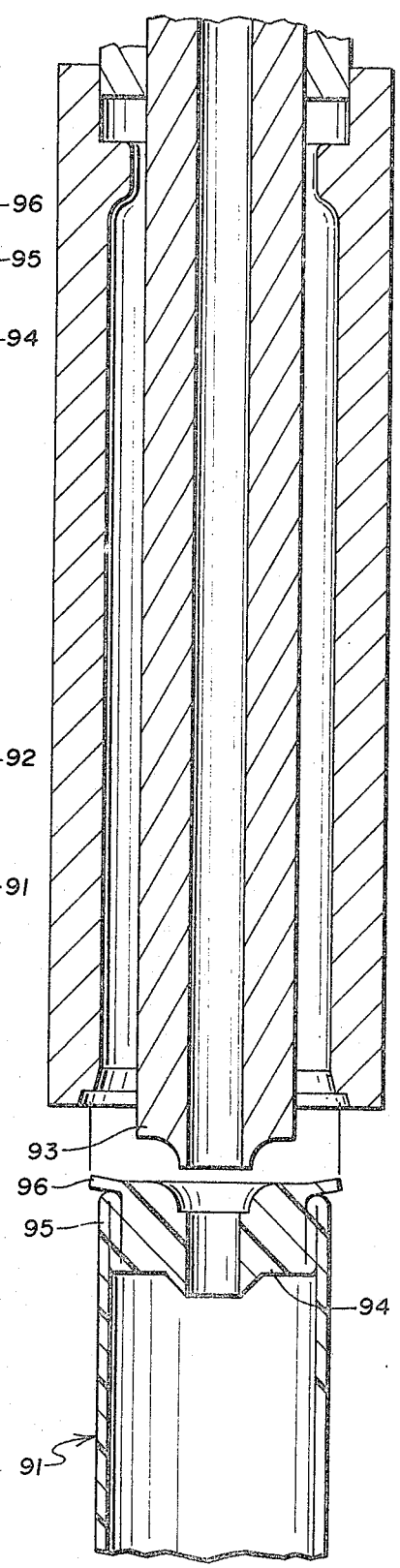
FIG. 24 is a vertical sectional view of the upper die members shown in FIGS. 22-23, the lower die member having been withdrawn and the upper die section lowered to eject the flanged shell casing, the latter being shown fragmentarily.

FIGS. 22–24, inclusive, show a one-step method of manufacturing a flanged or rimmed one-piece casing with a single set of dies. The tube 91 is heated at one end, as shown in FIGS. 4–6, for about 8–14 seconds and is then placed within the die having lower member 92 cooperating with upper die member 93 to form a flanged or rimmed base section 94. The time within the die members is about 4–12 seconds. Thereafter, lower die member 92 is partially withdrawn and upper die member 93 is lowered, causing the base section 94 to be telescoped within the supporting walls 95 and the rim 96 to be turned upwardly, as shown in FIG. 23. Subsequent complete withdrawal of die member 92 and associated further lowering of upper die member 93 causes the casing to eject, the rim 96 extending radially outwardly and axially upwardly. A head 97, such as shown in FIG. 25, may thereafter be secured in the conventional manner.

Figure 26:
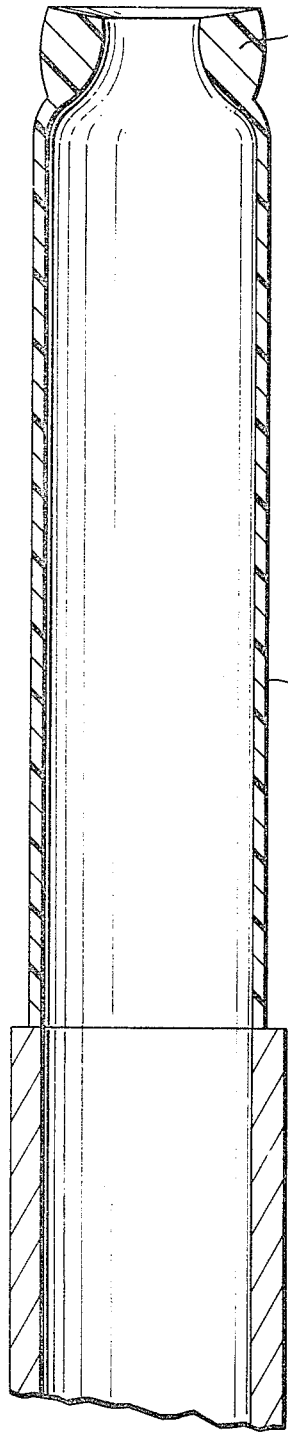
FIG. 26 is a vertical sectional view of a section of plastic tubing of predetermined length, the end of which has been suitably softened in preparation for being formed into a shell casing having a telescoped base.
Figure 27:
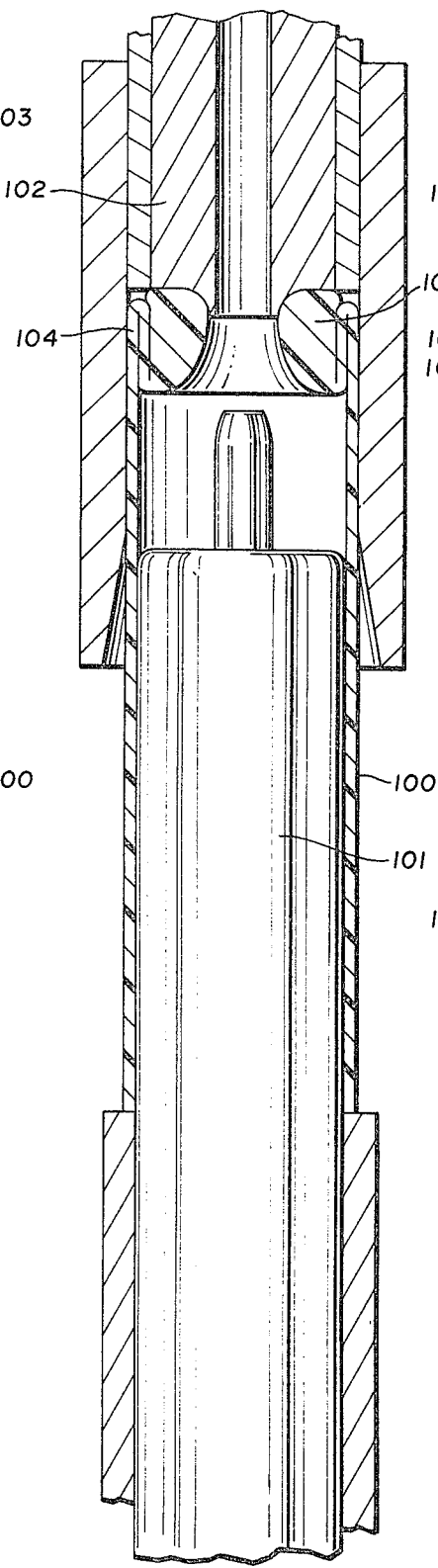
FIG. 27 is a vertical sectional view of the softened end of the tube shown in FIG. 26 being telescoped while hot into the adjoining section of the tube by a single set of die members.
Figure 28:
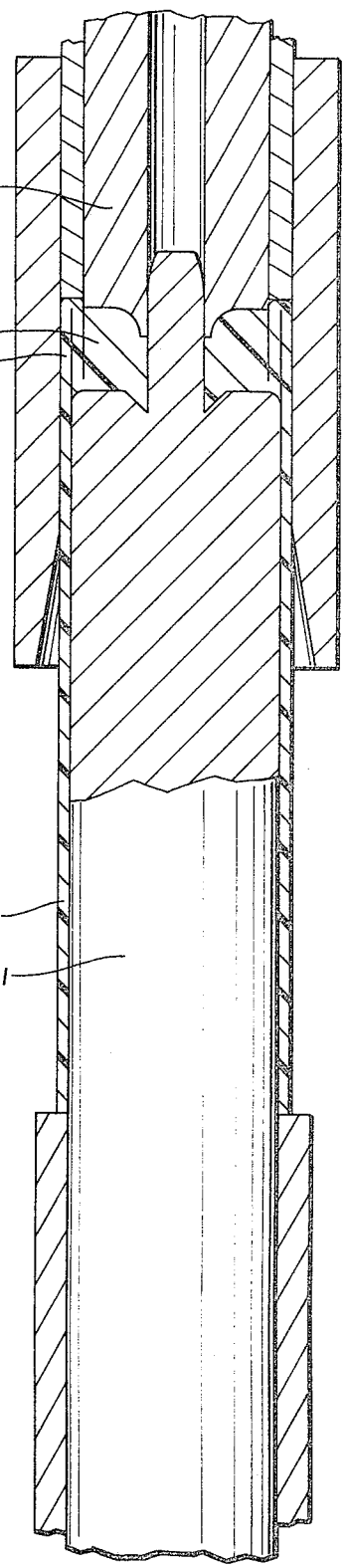
FIG. 28 is a vertical sectional view showing the same set of die members shown in FIG. 27, progressing to form the telescoped end portions of the tube into a telescoped base.

FIGS. 26–28, inclusive, show a one-step operation of forming a one-piece casing with a standard depth base section while the softened portion remains heated. FIG. 26 shows the tube 100 after being heated 8–14 seconds. It is then placed in a die having lower die member 101 extending upwardly therewithin, as shown in FIG. 27, and supporting same so that as upper die member 102 is lowered, the softened portion 103, as shown in FIG. 27, is telescoped within the adjacent supporting tube wall portions 104. The continued lowering of the upper die member 102 and simultaneous raising of lower die member 101 causes the softened portion 103 to be formed while warm into a base section of standard axial dimensions, as shown in FIG. 28. The softened portion 103 is maintained in the position shown in FIG. 28 for about 4–12 seconds, depending upon the amount of plastic utilized to obtain a base section of the particular thickness desired. Thereafter, the lower die member 101 is withdrawn and upper die member 102 is lowered to eject the casing after which a head may be secured thereto in the conventional manner.

FIGS. 29–31, inclusive, show a one-step operation of forming a one-piece casing with a thin base section, while the softened portion remains heated. The upper end of the tube 110 is heated to a temperature of 370°–375° F. to cause about a ¾″ end portion 111 to shrinkback, as shown in FIG. 29. It is then placed, while heated, in the die having lower die member 112 in supporting relation while upper die member 113 is lowered, causing the softened end portion 111 to telescope within the adjacent supporting walls 114, as shown in FIG. 30. As the upper die member 113 continues to lower, the telescoping action is completed and lower die member 112 is raised to form the softened portion 111 into a thin base member 115, as shown in FIG. 31. It is held between these two die members for about 4–6 seconds, after which lower die member 112 is withdrawn and upper die member 113 is lowered to eject the casing for subsequent heading, as hereinbefore described.

Figure 32:
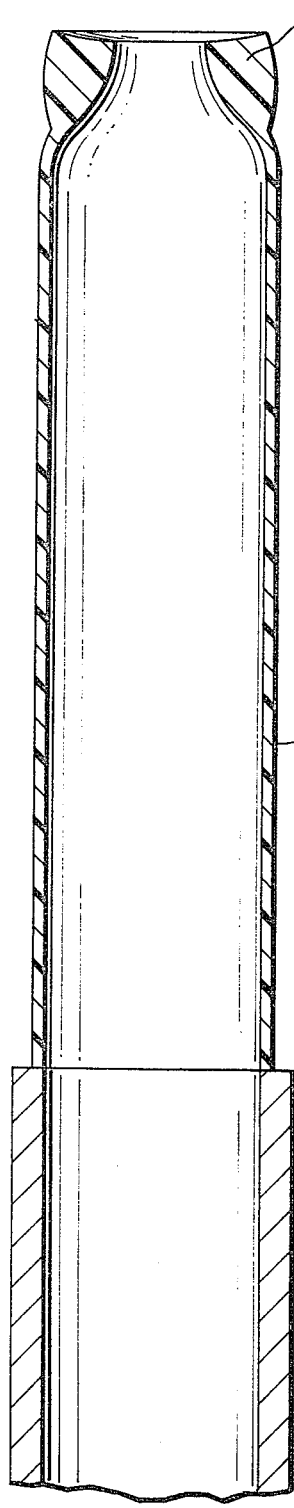
FIG. 32 is a vertical sectional view of a plastic tube of predetermined length having been softened in preparation for being formed while warm by a single set of die members into a shell casing having a base of standard axial dimensions.
Figure 33:
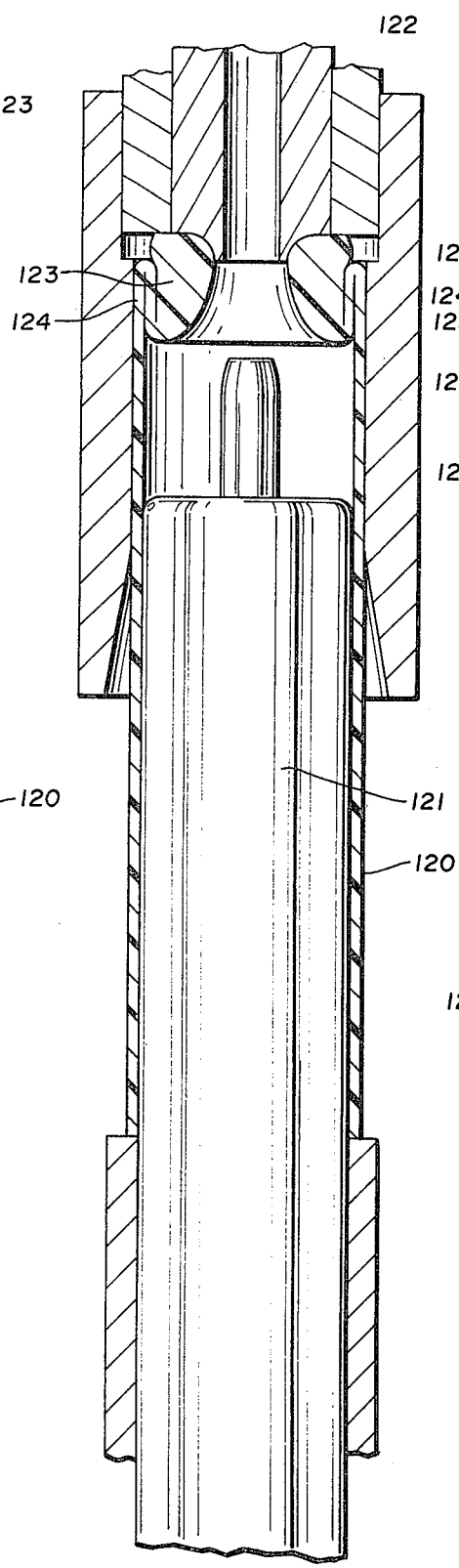
FIG. 33 is a vertical sectional view of the heated end of the tube of FIG. 32, while still warm, being telescoped within the adjoining and supporting portions of the tube by the upper one of the die members.
Figure 34:
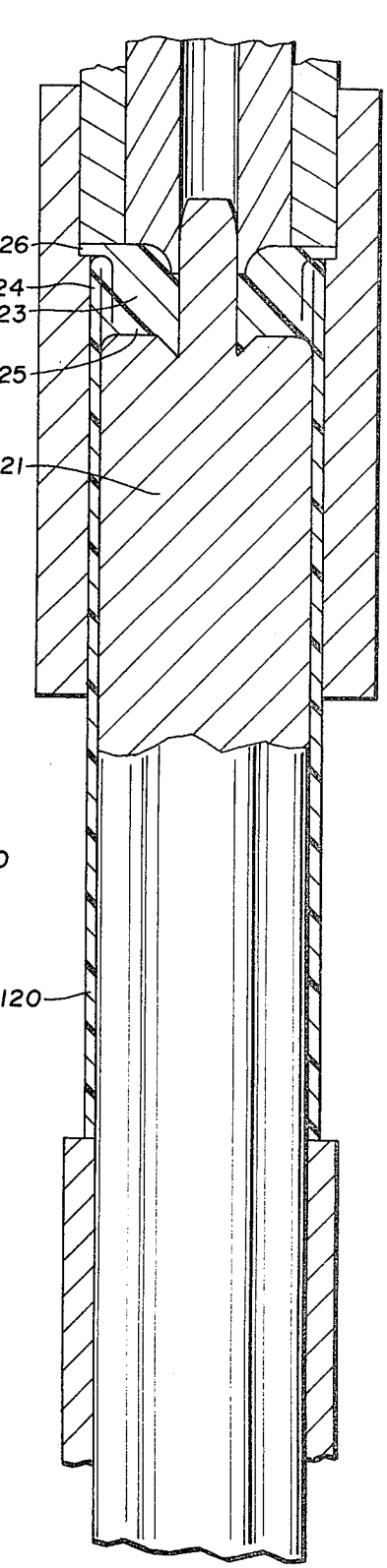
FIG. 34 is a vertical sectional view of the die members of FIG. 33, forming the end portion shown therein, in the same operation, into a casing having a telescoped and flanged base section of substantially standard dimensions.

FIGS. 32–34, inclusive, shows the formation of a rimmed one-piece shotshell casing in a one-step operation in which about 1½″ of the end portion of the tube 120 is heated for about 8–14 seconds, as shown in and described with respect to FIGS. 4–6 to soften same. Thereafter, the tube is placed in a die, the lower member of which supports the tube as the upper member 122 of which descends to telescope the softened portion 123 within the tube wall supporting structure 124, as shown in FIG. 33. As the upper die member 122 continues to descend and the lower die member 121 is raised, they form the softened portion 123 into a flange or rim 126 to provide a flanged or rimmed base section integral with the tube 120, as shown in FIG. 34. The base section 125 remains within the die members 121–122, as shown in FIG. 34, for 4–12 seconds and thereafter the lower die member 121 is withdrawn and upper die member 122 is lowered to eject the casing. Thereafter, the tube 120 may have a head secured thereto in the convention manner, as hereinbefore described and as shown in FIG. 25.

Figure 35:
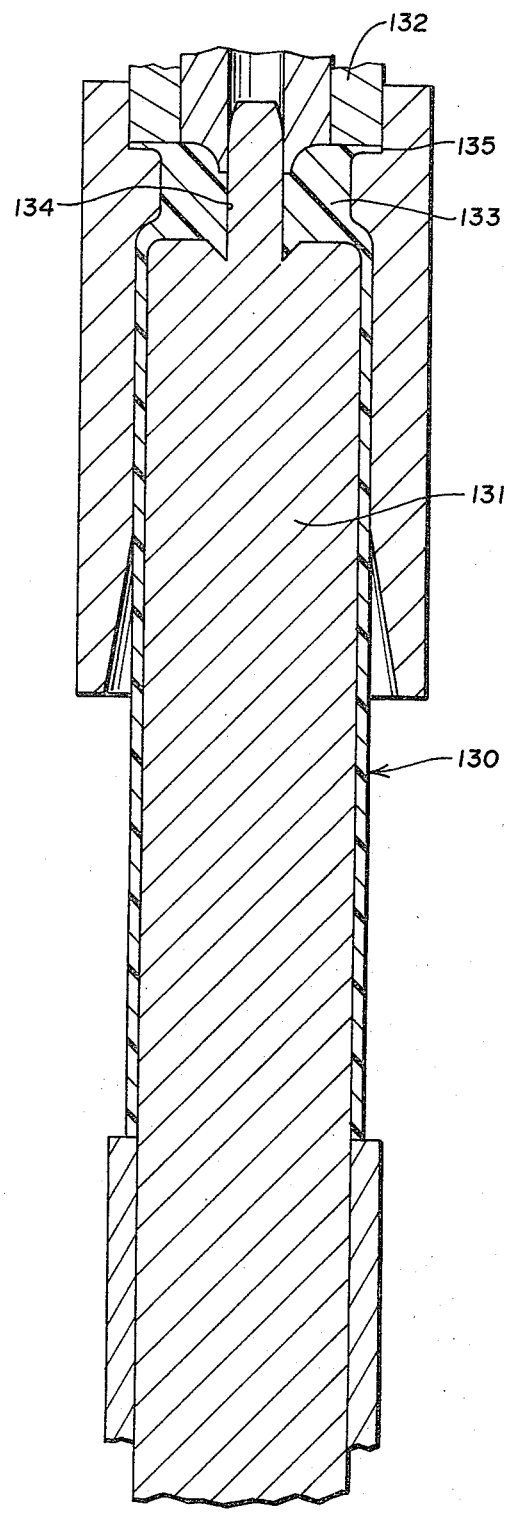
FIG. 35 is a vertical sectional view of a section of biaxially oriented tubing, one end of which has been warmed, as shown in FIGS. 4-6, and formed into an integral base section having a thin rim extending radially outwardly from its outer end.

FIG. 35 shows a tube 130 after one end thereof has been heated 9.5–14 seconds, as shown in FIGS. 4–6, and then placed within a die, the lower member 131 of which in cooperation with the upper member 132 thereof has formed the heated end portion into a base section 133 of standard height and having a primer opening 134, and an annular rim 135 extending radially outwardly from its outer end.

Figure 36:
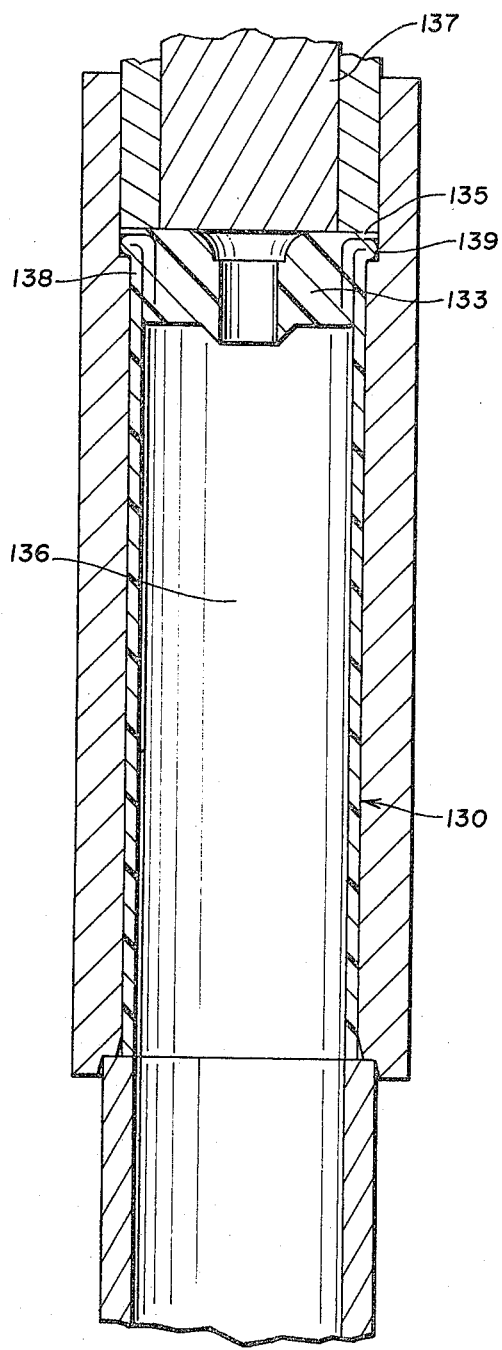
FIG. 36 is a vertical sectional view of the section of tubing shown in FIG. 35 in a second set of dies which have reversed the wall structure of the tubing and telescoped its base section into the supporting tubular wall portions of the tube and has formed a radially outwardly extending flange from the reversed wall structure abutting said rim.

FIG. 36 shows the tube 130 after being removed from the die shown in FIG. 35 and cooled for a minimum of 14 seconds in a second set of dies, the lower member 136 of which supports the tube while the upper member 137 descends and telescopes the major portion of the base section 133 within the supporting walls 138 of the tube. As shown, there is sufficient clearance between the two die members 137–138 adjacent the rim 135 so that a portion of the tubular wall structure, which has reversed upon itself to permit the telescoping action, is formed into an annular flange 139 which extends normally outwardly beyond the supporting walls 138 and which abuts the rim 135.

FIG. 37 shows the casing 130 formed in the above telescoping and forming operation after a brass head 140 has been applied and secured thereto. It will be noted that the thin rim 135 and annular flange 139 are compressed and secured within the rim 141 of the head.

The method and product produced as described above with respect to FIGS. 35–37, inclusive, is the preferred method and product, but as previously indicated, others may prefer one of the other methods. The height of the base section may, of course, be varied as desired as hereinbefore described, with the heating and cooling periods being shortened as the height is diminished.

The tubing from which we have made the shotshell casings described above is known in the trade as Reifenhauser tubing. We have utilized a high density polyethylene tube made of material which may be purchased under the brand identification of Soltex Fortiflex Brand B45-06R-09 from Soltex Polymer Corporation, Houston, Texas. The tubing made from this material is stretched both longitudinally and circumferentially in a uniform manner, such as that shown in the above Diedrich patent, to produce tubing of the desired diameters, the side walls of which are straight and of uniform thickness and orientation throughout. The $R_L$ of such tubing is preferably within the range of 4.365–8.150 and its $R_c$ is preferably within the range of 1.056–1.219. $R_L$ is designated as the longitudinal plastic orientation ratio and $R_c$ is designated as the circumferential plastic orientation ratio.

We have found that when a shotshell is formed in accordance with our invention, a substantial amount of biaxial orientation is retained within the base section of the casing. Our tests to date indicate that the average $R_L$ of the basewad of such a shell approximates 1.608 and the $R_c$ approximates 0.825 when the tube walls from which the basewad is formed have an average $R_L$ approximating 5.25 and an average $R_c$ approximating 1.14. The orientation retained varies somewhat, depending upon the gauge of the casing and the configuration of the basewad.

We have found that we can produce shotshell casings in the manners described hereinabove which have improved characteristics, especially with respect to volume capacity and reloadability. We have manufactured by the above methods satisfactory shotshell casings having a basewad depth ranging between 0.115" to 0.350". We prefer, when increased volume is needed, to utilize a casing having a basewad height of 0.115" which, of course, is substantially less than the standard basewad heigth of 0.340". In so doing, we have utilized biaxially oriented tubing which has straight walls of uniform thickness and internal and external diameters. The thickness of such tubing has varied between 0.012" to 0.039", depending upon properties desired. Such tubing has been biaxially oriented in a uniform manner throughout its length and has an $R_L$ value of approximately 4.365–8.150 and an $R_c$ value of approximately 1.056–1.219.

We have found that despite the shrinkback of the softened end portion of these tubes, the base sections have retained their biaxial orientation to a substantial degree and we believe this is the reason we can utilize basewads of substantially lesser height. In any event, we find that the base sections when formed as described herein do have improved performance characteristics and the reloadability remains at a high level despite the inherent application of heat to one end of the tube and the deleterious effects upon the tube side walls which one would anticipate to be a result of such heating.

We have found that through the use of telescoping the base sections within the supporting walls of the tube and the relatively thin base section, we can produce an excellent shotshell casing in which the volume remaining for shot and propellant is substantially increased. Thus, for a base having a height of 0.115", the percentage of volume of the shell remaining for shot and propellant has been found to exceed 95% for a 12 gauge 2¾" shell and 95.5% for a 3" shell.

When a basewad of standard dimensions is utilized, the usual volumes are provided, as shown in FIG. 1. A standard load of propellant 142 and shot 143 is then utilized. The primer 144 and obturating wad 145 are positioned as shown, and the end 146 of the tube 130 is turned in over the shot charge to form an integral closure for the shell.

Since tubing such as the Reifenhauser tubing is readily available and can be produced relatively inexpensively, and since the equipment required for the practice of our invention is simple and relatively inexpensive, and since the time required to produce a highly satisfactory shotshell casing through the use of these methods is minimal, we can produce a relatively inexpensive functional shotshell casing. Moreover, such casings have been found to be highly reloadable and to eliminate most, if not all, of the adverse features of previously known shotshells in that the walls of the tube are of uniform thickness and orientation throughout their length, the basewad is integral with the side walls, maximum load volume is available, increased versatility as to manufacture is provided, less plastic material is required, and less non-reusable scrap is produced. Moreover, these methods and apparatus as disclosed herein may be readily incorporated into previously known continuous production lines of shotshell manufacture.

It will, of course, be understood that various changes may be made in the form, details, arrangement and proportions of the parts without departing from the scope of our invention which consists of the matter shown and described and set forth in the appended claims.

We claim:

1. A method of producing a cartridge case from a thermoplastic tube having wall structure supporting at one end thereof an integral transverse base section with a longitudinally extending primer opening therein comprising, telescoping that transverse base section into the adjacent portions of that supporting wall structure.

2. A method of producing a cartridge case comprising the steps of, heating one end portion of a tube made of thermoplastic material sufficiently to soften the same, forming that softened end portion into an integral transverse base section with a longitudinally extending primer opening therein, and telescoping that transverse base section into the portions of that tube adjacent to that portion of the tube which was previously softened and formed into the base section.

3. A method of producing a cartridge case comprising the steps of, heating one end portion of a tube made of oriented thermoplastic material only sufficiently to soften the same, forming that softened end portion into an integral transverse base section with a longitudinally extending primer opening therein, and telescoping that transverse base section into the portions of that tube adjacent to that portion of the tube which was previously softened and formed into the base section.

4. A method of producing a cartridge case comprising the steps of heating one end portion of a tube which is made of oriented plastic throughout its length, sufficiently to soften the same, forming that softened end portion into an integral transverse base section with a longitudinally extending primer opening therein, and telescoping that transverse base section into the portions of that tube adjacent to that portion of the tube which was previously softened and formed into the base section.

5. A method of producing a cartridge case designed to substantially reduce the likelihood of tube failure above the base and at the forward end of its surrounding head upon firing comprising, the steps of heating the wall structure of one end portion of a tube made of plastic which is biaxially oriented throughout its length, in order to soften said end portion, forming that softened end portion into an integral transverse base section with a longitudinally extending primer opening therein, and telescoping the softened end portion into the adjacent wall structure of that tube.

6. A method of producing a cartridge case having walls designed to substantially reduce the likelihood of a tube failure above the base and at the forward end of its surrounding head upon firing comprising, the steps of heating one end portion of a tube made throughout its length of thermoplastic material which is biaxially oriented in order to soften said end portion, forming that softened end portion into an integral transverse base section having axial dimensions substantially greater than the wall thickness of that tube, and telescoping said transverse base section into the adjacent non-softened portion of that tube.

7. A method of producing a cartridge case comprising, the steps of heating one end portion of a tube which is comprised of a biaxially oriented material uniformly throughout its length, sufficiently for proper forming of the same, forming that softened end portion into an integral transverse base section with a longitudinally extending primer opening therein, and telescoping said transverse base section into the adjacent non-softened portion of that tube.

8. The method defined in claim 5, and applying a head to that end portion of that tube in surrounding and secured relation to that transverse base section.

9. The method defined in claim 5, in which the step of telescoping the transverse base section into the adjacent portion of that tube includes telescoping the transverse base section entirely within that adjacent portion of the tube.

10. The method defined in claim 5, in which the step of telescoping the transverse base section into the adjacent portion of the tube includes reversing the wall structure of the tube upon itself.

11. The method defined in claim 5 in which the step of telescoping the transverse base section into the adjacent portion of the tube includes turning the portion of the tube wall structure which supports the base section both inwardly and axially of the tube.

12. The method defined in claim 5 in which the step of telescoping the transverse base section into the adjacent portion of the tube includes that portion of the wall structure of the tube which supports the base section being moved inwardly and axially toward the opposite end of the tube.

13. The method defined in claim 5 wherein the step of telescoping the transverse base section into the tube wall structure includes reversing upon itself the wall structure which supports the base section and causing portions thereof to extend concentrically with the remainder of the tube walls.

14. The method defined in claim 5 wherein the step of telescoping the transverse base section into the tube wall structure includes reversing upon itself the wall structure which supports the base section and forming that wall structure into a concentric, contiguous and annular wall of smaller diameter than the remainder of the tube.

15. The method defined in claim 5 wherein the step of forming the softened end portion of the tube includes forming an annular rim extending axially outwardly from the peripheral portions of the base section.

16. The method defined in claim 5, wherein the step of forming the softened end portion of the tube includes forming an annular rim extending radially outwardly from the peripheral portions of the base section.

17. The method defined in claim 5, wherein the step of forming the softened end portion of the tube includes forming an annular rim extending axially and radially outwardly from the peripheral portions of the base section.

18. The method defined in claim 5 and including cooling the formed base section before telescoping same into the wall structure of the tube.

19. The method defined in claim 5, wherein the step of telescoping the transverse base section into the wall structure of the tube is performed while the end portion of the tube remains soft.

20. The method defined in claim 5 wherein the telescoping step is performed prior to the base section forming step.

21. The method defined in claim 5, wherein the telescoping step is performed before the softened end portion of the tube cools.

22. The method defined in claim 5 wherein the telescoping step is performed after the base forming step.

23. The method defined in claim 5 wherein the telescoping step is performed after the base section forming step.

24. The method defined in claim 5, wherein the base section forming and telescoping steps are performed in a single operation.

25. The method defined in claim 5 wherein the step of heating the wall structure is performed upon a tube composed of a uniformly biaxially oriented thermoplastic material.

26. The method defined in claim 5 wherein the softened end portion of the tube is formed into an integral transverse base section having a maximum diameter slightly less than the internal diameter of the tube.

27. The method defined in claim 5 wherein the transverse base section is telescoped inwardly a distance approximately 10–15 times the thickness of the side wall of the tube.

28. The method defined in claim 5 wherein the transverse base section is telescoped inwardly a distance less than but approaching 5 times the thickness of the side walls of the tube.

* * * * *

UNITED STATES PATENT AND TRADEMARK OFFICE
CERTIFICATE OF CORRECTION

PATENT NO. : 4,332,766

DATED : June 1, 1982

INVENTOR(S) : Jack A. Erickson, Luke J. Davich and Richard W. Prouix

It is certified that error appears in the above-identified patent and that said Letters Patent are hereby corrected as shown below:

Column 1, line 59, the word "a" should be deleted.

Column 10, line 7, the character "$\Delta$" should be deleted and the character --"-- should be inserted in place thereof.

Column 13, line 19, the word appearing as "heigth" should be --heighth--.

*Signed and Sealed this*

*Seventeenth* Day of *August 1982*

[SEAL]

*Attest:*

GERALD J. MOSSINGHOFF

*Attesting Officer*     *Commissioner of Patents and Trademarks*